(12) United States Patent
Meyhofer et al.

(10) Patent No.: US 10,884,271 B2
(45) Date of Patent: Jan. 5, 2021

(54) LENS MASKING SYSTEM FOR A VEHICLE

(71) Applicant: UATC, LLC, San Francisco, CA (US)

(72) Inventors: Eric Meyhofer, Pittsburgh, PA (US); David Rice, Pittsburgh, PA (US)

(73) Assignee: UATC, LLC, San Francisco, CA (US)

(*) Notice: Subject to any disclaimer, the term of this patent is extended or adjusted under 35 U.S.C. 154(b) by 184 days.

(21) Appl. No.: 16/018,246

(22) Filed: Jun. 26, 2018

(65) Prior Publication Data

US 2018/0299903 A1 Oct. 18, 2018

Related U.S. Application Data

(63) Continuation of application No. 14/979,351, filed on Dec. 22, 2015, now Pat. No. 10,048,696.

(51) Int. Cl.
*H04N 5/225* (2006.01)
*G05D 1/02* (2020.01)
*G02F 1/133* (2006.01)
*H04N 13/243* (2018.01)

(52) U.S. Cl.
CPC ....... *G02F 1/13306* (2013.01); *H04N 5/2257* (2013.01); *H04N 5/2258* (2013.01); *H04N 13/243* (2018.05)

(58) Field of Classification Search
CPC .............. G02F 1/13306; H04N 5/2257; H04N 5/2258; H04N 13/243
USPC .......................................................... 701/28
See application file for complete search history.

(56) References Cited

U.S. PATENT DOCUMENTS

| | | | |
|---|---|---|---|
| 7,016,518 B2 | 3/2006 | Vernon | |
| 7,596,242 B2 | 9/2009 | Breed | |
| 7,612,803 B2 | 11/2009 | Meitav | |
| 7,800,662 B2 | 9/2010 | Sumiya | |
| 7,922,327 B2 | 4/2011 | Su | |
| 8,629,389 B2 | 1/2014 | Barrows | |
| 8,949,016 B1 | 2/2015 | Ferguson | |
| 9,549,124 B2 | 1/2017 | Duran | |
| 2007/0052839 A1 | 3/2007 | Kong | |

(Continued)

FOREIGN PATENT DOCUMENTS

| | | |
|---|---|---|
| JP | H09 214827 | 8/1997 |
| JP | 2007251258 | 9/2007 |

(Continued)

OTHER PUBLICATIONS

ISR and Written Opinion issued in PCT/US2016/067821 dated Mar. 24, 2017.

(Continued)

*Primary Examiner* — Brian P Sweeney
(74) *Attorney, Agent, or Firm* — Dority & Manning, PA

(57) ABSTRACT

An image processing system for a vehicle can include a set of cameras generating image data of a surrounding environment of the vehicle, and a masking layer comprising a plurality of pixels. The system can detect, in first image data generated by the set of cameras, one or more light sources in a field of view of a respective camera of the set of cameras. The system can then activate a number of pixels of the masking layer to block each of the one or more light sources for the respective camera, preemptively bolstering a quality of second image data generated by the set of cameras while the masking layer blocks each of the one or more light sources.

20 Claims, 5 Drawing Sheets

(56) References Cited

U.S. PATENT DOCUMENTS

| | | | |
|---|---|---|---|
| 2007/0291130 A1* | 12/2007 | Broggi | G05D 1/0251 |
| | | | 348/218.1 |
| 2008/0007645 A1* | 1/2008 | McCutchen | H04N 5/238 |
| | | | 348/360 |
| 2010/0188532 A1 | 7/2010 | Kusaka | |
| 2011/0204209 A1 | 8/2011 | Barrows | |
| 2012/0101680 A1 | 4/2012 | Trepaagnier | |
| 2013/0215229 A1 | 8/2013 | Yerli | |
| 2015/0092083 A1 | 4/2015 | Lam | |
| 2015/0138348 A1 | 5/2015 | Goldstein | |
| 2016/0357189 A1 | 12/2016 | Barrows | |
| 2016/0366337 A1 | 12/2016 | Duran | |
| 2017/0013188 A1 | 1/2017 | Kothari | |
| 2017/0054925 A1 | 2/2017 | Honda | |
| 2017/0075357 A1 | 3/2017 | MacNeille | |
| 2017/0177000 A1 | 6/2017 | Meyhofer | |

FOREIGN PATENT DOCUMENTS

| | | |
|---|---|---|
| JP | 2009214827 | 9/2009 |
| KR | 10-2007-0069653 | 7/2007 |
| KR | 10-2013-0057603 | 6/2013 |
| KR | 10-2015-0134019 | 12/2015 |

OTHER PUBLICATIONS

IPRP issued in PCT/2016/067821 dated Jul. 5, 2018.
EESR issued in EP 16879983.1 dated Sep. 28, 2018.

* cited by examiner

LENS MASKING SYSTEM FOR A VEHICLE

CROSS REFERENCE TO RELATED APPLICATION

This application is a Continuation of U.S. patent application Ser. No. 14/979,351, titled "Intelligent Lens Masking System for an Autonomous Vehicle," and filed on Dec. 22, 2015; the aforementioned application being hereby incorporated by reference in its entirety.

BACKGROUND

Autonomous vehicles (AVs) may require continuous, or near continuous, sensor data gathering and processing in order to operate safely through real-world environments. In doing so, many AVs include sensor arrays that have multiple sensor systems. For example, AV sensor arrays can include any number of passive sensor systems, such as one or more cameras (e.g., stereo cameras) to continuously monitor a situational environment as the AV travels along any given route. In order for the AV to operate safely and reliably, the quality of the real-time data collected by the camera(s) may be crucial.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
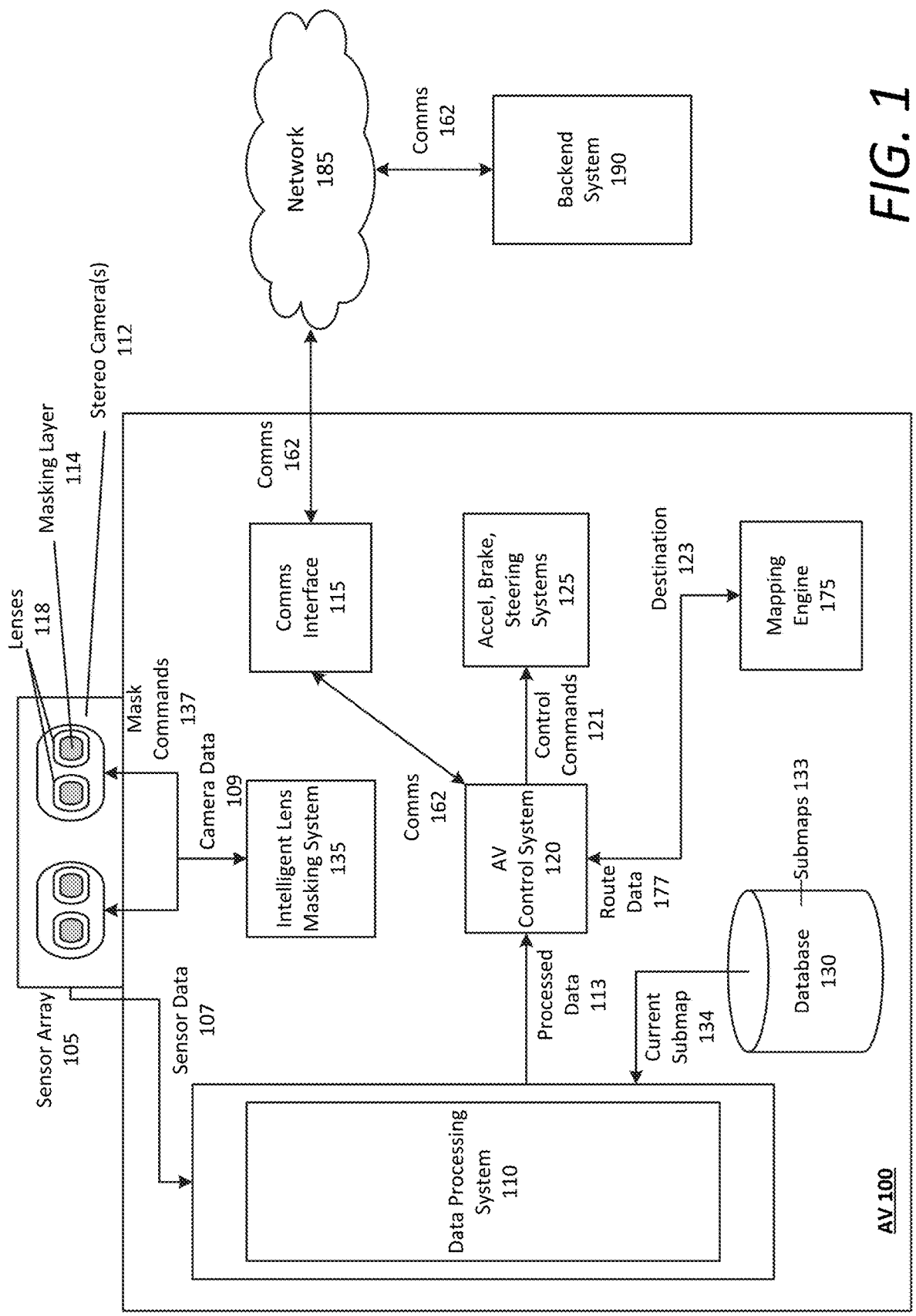
FIG. 1 is a block diagram illustrating an example automated vehicle including an intelligent lens masking system, as described herein.

Video and image recording systems for a camera array of an autonomous vehicle (AV) can react dynamically to changes in lighting conditions by adjusting any number of configurable parameters. For example, in response to a lighting change from bright to dark, the recording systems can adjust camera features such as the aperture settings, resolution, frame rate and/or shutter speed, color temperature settings, gain or ISO settings, saturation and contrast settings, focus, and the like. However, in certain circumstances a light source in the field of view of any respective camera in the camera array (e.g., the Sun) can pollute the perception data from those respective cameras, degrading the quality of data from those respective cameras. Certain passive and/or adaptive filters or post acquisition data processing can be utilized to reduce the effects of such light sources. However, for optimal operation of the AV, maximization of the quality of the initial acquisition of camera data can be less burdensome for the on-board data processing, and can provide a cost-efficient solution to current processes.

To address the deficiencies of current solutions, an intelligent lens masking system is provided that can dynamically block light sources on the camera lens of each camera on the AV's sensor array. The intelligent lens masking system can dynamically identify, based on real-time data from the camera array of the AV, one or more light sources for each respective camera in the camera array. The lens of each camera can include a masking layer, which can be operated by the intelligent lens masking system to dynamically block the light source(s) for each respective camera by activating a number of pixels of the masking layer. Additionally, the intelligent lens masking system can track the light source(s) while the light source(s) remain in a field of view of the respective camera. By tracking the light source(s) in the field of view, the intelligent lens masking system can dynamically activate and deactivate respective pixels of the masking layer to continuously block the light source(s) across the field of view of the lens as the AV travels throughout a given region.

In many aspects, the masking layer can comprise a liquid crystal display (LCD) layer, such as a transparent active or passive-matrix LCDs operated by the intelligent lens masking system. Accordingly, voltages applied locally to pixels of the LCD can "activate" those pixels in a manner that reverses the transparency (or adjusts the transparency levels) of those pixels. For example, twisted nematic (or super-twisted nematic) layers (in conjunction with one or more polarizing filters can comprise the masking layer on the camera lens, which can enable the intelligent lens masking system to apply local voltages to specified pixels in order to polarize incoming light in a manner that partially or completely blocks the light from being received by the camera. However, other technologies may be used for the masking layer, such as in-plane switching, fringe field switching, vertical alignment, or blue phase mode technologies.

As used herein, the "masking layer" is discussed as a singular layer, but can include any number of actual layers of filters (e.g., flexible polarized filter layers) and/or one or more liquid crystal layer(s). Accordingly the "masking layer" as provided herein is singular in function in that it enables dynamic and targeted blocking of light sources as the AV travels.

Furthermore, the "camera," "camera array," or "camera systems" described herein may include any type of sensor device that utilizes a lens to receive visible, and in certain instances, ultraviolet and/or infrared light. Such cameras may include stereo cameras having two or more lenses each including a masking layer described herein. Additionally, the cameras can provide real-time data to an on-board data processing system of the AV, which processes the data in order to ensure that the AV identifies traffic controls and potential hazards and safely travels along a current route.

As used herein, a "light source," when in the field of view of a respective camera, can negatively impact the quality of the data acquired. Such light sources include points of light that are directly perceived in the field of view of the respective camera. Example light sources include the Sun, reflected sunlight, artificial light sources (e.g., streetlights, headlights, emergency vehicle lights, stadium lights, etc.), and the like.

Among other benefits, the examples described herein achieve a technical effect of bolstering the quality of real-time data provided by the camera array of an AV by dynamically blocking light sources that would otherwise negatively impact the data.

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example AV 100 including an intelligent lens masking system 135, as described herein. The AV 100 can include a sensor array 105 comprising any number of passive or active sensor systems. Example active sensor systems can include radar or LiDAR systems, which generate and transmit carrier signals (i.e., electromagnetic waves of varying wavelengths) and measure the reflected light from surface features to perform ranging or to generate a dynamic map of the operational environment of the AV 100. Example passive sensor systems can include a set of video cameras or a stereo video camera system 112 that provides visual data based on natural or artificial light.

The sensor data 107 captured by the sensor array 105 can be processed by an on-board data processing system 110 of the AV 100. The data processing system 110 can utilize sub-maps 133 stored in a sub-map database 130 of the AV 100 to compare with the sensor data 107 in order to maneuver through road traffic to a particular destination. The sub-maps 133 can contain pre-recorded surface data for a given region that the data processing system 110 can compare to the real-time sensor data 107 while the AV 100 operates through road traffic. For example, the data processing system 110 can utilize a current sub-map 134 from the database 130 that includes recorded 3D LiDAR data and 3D stereo data of the current route traveled by the AV 100. The data processing system 110 can continuously compare the sensor data 107 to the to the 3D LiDAR data and stereo data of the current sub-map 134 to identify potential hazards, such as pedestrians, other vehicles, bicyclists, etc.

The on-board data processing system 110 can provide processed data 113 to an AV control system 120 which can operate the acceleration, braking, and steering systems 125 of the AV 100. In the example shown in FIG. 1, the AV control system 120 is shown as separate from the data processing system 110 for illustrative purposes. The AV control system 120 can be included as one or more processing resources of the on-board data processing system 110 of the AV 100.

In certain aspects, the AV control system 120 can be provided with a destination 123 from an AV user or a backend system 190 that manages a fleet of AVs throughout a given region. For example, the AV 100 can transmit and receive communications 162 with the backend system 190 over one or more networks 185. These communications 162 can include transportation commands from the backend system 190 to facilitate transportation requests for requesting users seeking transport. The communications 162 can also include location updates, status updates, route information, pick-up and drop off location data, and the like. With regard to operating the AV 100, the backend system 190 or a passenger of the AV 100 can specify a particular destination 123. Utilizing a current position of the AV 100 and the destination 123, the AV control system 120 can utilize a mapping engine 175 to receive route data 177 in order to operate the acceleration, braking, and steering systems 125 along a current route towards a particular destination 123. At the same time, the AV control system 120 can receive the processed sensor data 110 from the data processing system 110 to react to more imminent concerns, such as traffic signals, road conditions, road traffic, pedestrian activity, potential hazards, and the like. Thus, the AV control system 120 can generate and execute high level control commands 121 on the acceleration, braking, and steering systems 125 to drive the AV 100 to the destination 123 using the route data 177. Additionally, the AV control system 120 can generate and execute low level, more immediate, control commands 121 on the acceleration, braking, and steering systems 125 to react to imminent concerns identified by the data processing system 110.

According to examples described herein, the on-board data processing system 110 is maximally effective in processing sensor data 107 from the sensor array 105 when the quality of the sensor data 107 is maximized. Specifically, the data processing system 110 can expend unnecessary processing resources attempting to filter out point light sources in camera data 109 received from, for example, a stereo camera 112 of the sensor array 105. According to examples described herein, the camera systems (e.g., the stereo camera(s) 112) of the sensor array 105 each include a lens 118 that can comprise a masking layer 114 thereon, which can be controlled by an intelligent lens masking system 135 of the AV 100.

The intelligent lens masking system 135 can receive real-time camera data 109 from the camera systems of the sensor array 105. For each respective camera (e.g., each camera of the stereo camera 112), the intelligent lens masking system 135 can identify light sources (and/or the position of the light source(s) with respect to the respective camera) and generate mask commands 137 to activate a number of pixels of the masking layer 114 of each lens to block the light sources. In certain examples, the masking layer 114 for each lens 118 can be arranged as a matrix comprising any number of pixels. The intelligent lens masking system 135 can identify central locations, on the matrix representing the masking layer 114, that correspond to the point light sources, and measure an angular size for each light source. Accordingly, the intelligent lens masking system 135 can generate masking commands 137 to activate the pixels of the masking layer 114 to block the light source(s) based on (i) identified coordinates of the point light source(s) in the field of view of the stereo camera 112, and (ii) the measured size of each light source.

Additionally, the intelligent lens masking system 135 can track the light sources across the field of view of the respective lenses 118 of the stereo camera 112 as the AV 100 continues to drive along its current route. Accordingly, the intelligent lens masking system 135 can activate and deactivate pixels of the masking layer such that the light sources are continuously blocked as long as they remain within the field of view of the stereo camera 112.

The AV 100 can include several camera systems that continuously record the situational environment of the AV 100. For example, the AV 100 can include a stereo camera array on the roof of the AV 100, which can record real-time data with a 360° view of the immediate surroundings of the AV 100. Additionally, the AV 100 can include various cameras and/or stereo cameras 112 on its side mirrors, bumpers, integrated within the body work, and/or within the passenger compartment. Any number of the these cameras can include a masking layer 114 operatively coupled to the intelligent lens masking system 135, which can monitor the fields of view of every camera of the AV 100 in order to perform dynamic masking. Further description of the intelligent lens masking system 135 is provided with respect to FIG. 2 below.

Figure 2:
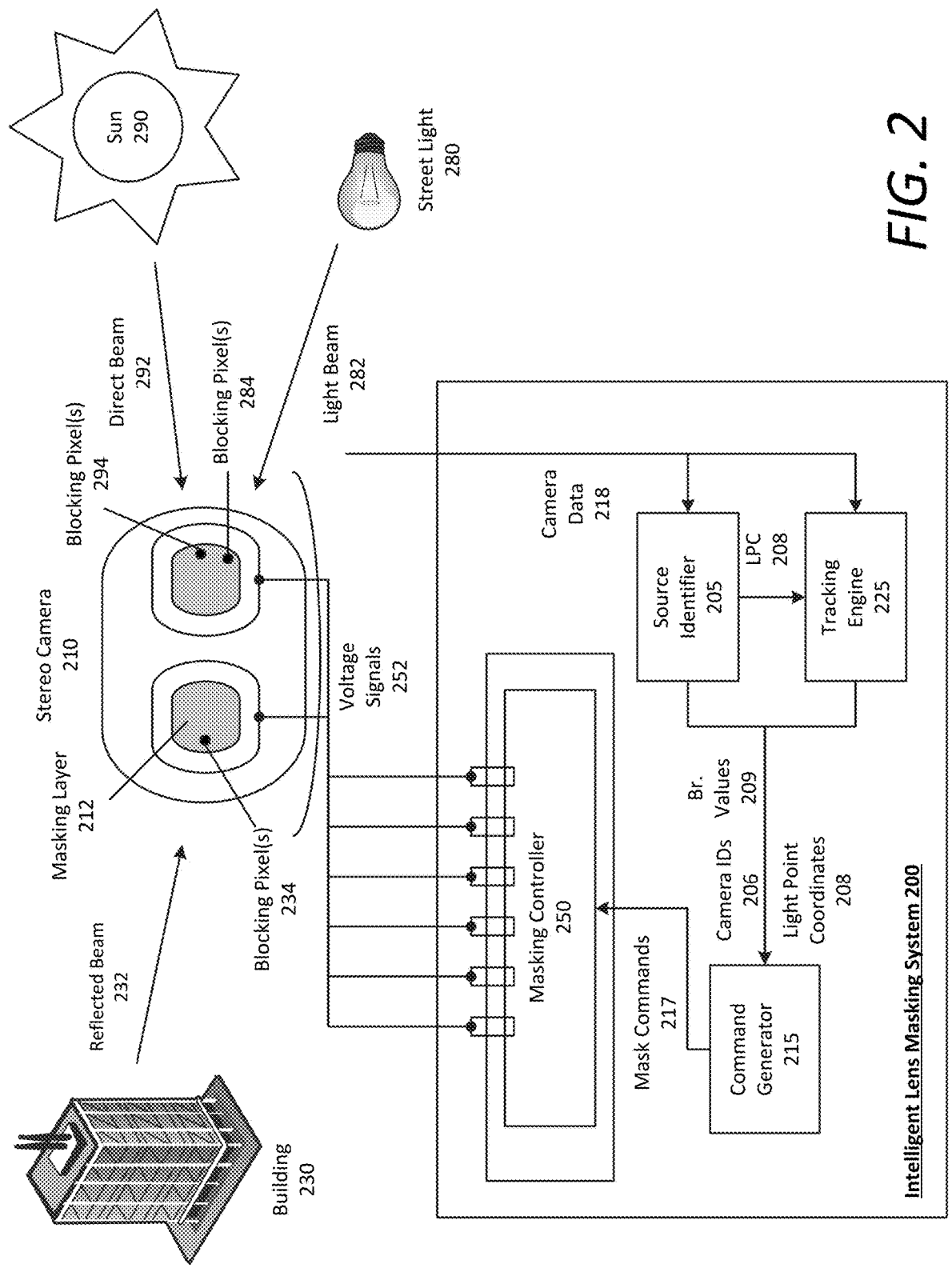
FIG. 2 is a block diagram illustrating an example intelligent lens masking system utilized in connection with a stereo camera of an AV.

FIG. 2 is a block diagram illustrating an example intelligent lens masking system 200 utilized in connection with a sensor array 105 of an AV 100. In examples described with respect to FIG. 2, the intelligent lens masking system 200 can be implemented as a component of the AV 100, such as the intelligent lens masking system 135 shown and described with respect to FIG. 1. Furthermore, for the sake of illustration, the intelligent lens masking system 200 shown in FIG. 2 operates on a single respective stereo camera 210 of the sensor array 105 shown and described with respect to FIG. 1. However, according to examples described herein, the intelligent lens masking system 200 can operate on any number of the camera systems that provide real-time sensor data 107 (e.g., camera data 218 included in the sensor data 107) for processing by the on-board data processing system 110 of the AV 100.

Referring to FIG. 2, the intelligent lens masking system 200 can operate as a standalone system of the AV 100, or may be integrated into one or more subsystems of the AV 100—such as the data processing system 110. In many aspects, the intelligent lens masking system 200 can include a light source identifier 205 which can receive real-time camera data 218 from the stereo camera 210. The source identifier 205 can analyze the camera data 218 to identify light sources in the field of view of each lens of the stereo camera 210. For example, the source identifier 205 can identify light sources corresponding to the Sun 290, a street light 280, and/or a building 230 that reflects sunlight in the field of view of the stereo camera 210. Any number of light sources may be identified that have the same or similar characteristics as a point of light that may have a negative impact on the quality of the camera data 218.

In some aspects, the source identifier 205 can determine whether a brightness of a particular light source exceeds a predetermined threshold. For example, the source identifier can measure a visual brightness (e.g., in units of lumens or lux) of each light source in the field of view, and determine whether the brightness of a respective light source exceeds a predetermined value (e.g., a threshold lumen value). This threshold value may be correlated to the effect that the light source would have on the quality of the camera data 218. Thus, if the brightness of a direct beam 292 from the Sun 290 exceeds the threshold value, the source identifier 205 can provide a camera identifier 206 and light point coordinates 208 to a command generator 215, which can generate mask commands 217 to block the direct beam 292 from the Sun 290 accordingly.

The intelligent lens masking system 200 can include a masking controller 250 that can process the mask commands 217 to generate and transmit voltage signals 252 to the particular pixels identified in the light point coordinates 208. The voltage signals 252 can activate the specified pixels on the masking layer 212 of the lens to create a number of blocking pixels 294 that can block the direct beam 292 from the Sun 290 from entering the stereo camera 210. Accordingly, for light sources (e.g., the Sun 290) that are determined by the source identifier 205 to exceed the predetermined brightness threshold, the masking controller 250 can generate specified voltage signals 252 that can completely block the beams from these light sources from entering the stereo camera 210.

In variations, the masking controller 250 can generate variable voltage signals 252 that cause pixels of the masking layer 212 to activate along a variable gray-scale, from very light gray to dark grey to black—depending on the voltage of the voltage signal 252. According to certain implementations, the source identifier 205 can identify the light point coordinates 208 of various light sources that have respective brightness above a minimum threshold. Accordingly, the source identifier 205 can measure a brightness values 209 for each of the light sources, which can be processed by a command generator 215 to generate corresponding mask commands 217 for each light source.

Based on the brightness values 209, the command generator 215 can generate mask commands 217 to cause the masking controller 250 to generate appropriate voltage signals 252. The voltage signals 252 can be transmitted to the correct camera lens based on camera identifiers 206 and to specified pixels on the masking layer 212 based on the light point coordinates 208 for the specified lens. Furthermore, the voltage signal 252 generated by the masking controller 250 can have a voltage based on the brightness value 209 measured by the source identifier 205. Accordingly, the voltage signal 252 will cause the specified pixels to filter or block the light source according to a sliding gray scale that is based on the brightness values 209 recorded for that particular light course.

As an addition to examples described herein, the command generator 215 can measure an angular size and shape or angular diameter of each of the light sources using the light point coordinates 208 such that the masking commands 217 generated by the command generator 215 precisely encompass the whole light source. Furthermore, for each respective light source, the command generator 215 can generate mask commands 217 that specify gray scale values for each pixel to be activated for the light source. Accordingly, the command generator 215 can generate mask commands 217 that cause gradients in gray scale over a light source. For example, the blocking pixels 294 for the direct beam 292 for the Sun 290 may include black pixels for the center of the light source, darker gray pixels immediately surrounding the Sun 290, and lighter gray pixels extending outwards from the Sun 290. Such gray-scale gradients can be dynamically calculated and implemented by the command generator 215 for any light source based on the brightness values 209 and the light point coordinates 208.

In many aspects, the light point coordinates 208 for each light source can be tracked by a tracking engine 225 of the intelligent lens masking system 200. Once identified by the source identifier 205, the tracking engine 225 can receive the real-time camera data 218 and/or the initial light point coordinates 208 and can track each of the light sources across the field of view of each lens of the stereo camera 210. The tracking engine 225 can provide the light point coordinates 208 dynamically to the command generator 215, which can dynamically generate updated mask commands 217 to continuously block the light sources as long as they remain in the field of view.

As an example, the field of view of the left lens of the stereo camera 210 can be affected by a reflected sunlight beam 232 from a building 230. The real-time camera data 218 can indicate the reflected beam 232 to the source identifier 205, which can provide the camera ID 206—indicating the stereo camera 210 and/or the lens of the stereo camera 210—and the light point coordinates 208 for the reflected beam 232 to the command generator 215. The command generator 215 can measure the angular size and shape of the reflected beam 232 and generate mask commands 217 indicating the specific blocking pixels 234 and voltages for those pixels 234 to block the reflected beam 232 while the reflected beam is within the field of view of the left lens of the stereo camera 210.

In some aspects, the pixels 234 specified by the command generator 215 in the mask commands 217 can be completely blocked out, causing the masking controller 250 to generate voltage signals 252 that fully activate the pixels (e.g., blacken the pixels). In such implementations, the masking controller 250 can operate the masking layer 212 of the lens in a binary manner. That is, either the pixels 234 can be fully activated or remain transparent. Thus, the tracking engine 225 can track the reflected beam 232 as the reflected beam 232 traverses across the field of view of the lens, and the command generator 215 can dynamically generate mask commands 217 to fully block the reflected beam 232 as long as the reflected beam is in the field of view of the stereo camera 210.

In variations, the pixels 234 specified by the command generator 215 in the mask commands 217 can be gray-scaled according to brightness values 209 measured by the source identifier 205. Accordingly, the command generator 215 can generate mask commands 217 that cause the masking layer 212 to filter and block the reflected beam 232 using gray-scaled voltage signals 252. Specifically, the masking controller 250 can generate lower voltage signals 252 for pixels 234 of the reflected beam having lower brightness values 209—activating lighter gray pixels—and higher voltage signals 252 for pixels 234 of the reflected beam having higher brightness values 209. Based on the relative brightness and shape of the reflected beam 232, the blocking pixels 234 will be partially or fully activated accordingly, and will traverse across the masking layer in correlation with the reflected beam 232 as the AV 100 travels.

FIG. 2 also indicates the right lens of the stereo camera 210 being affect by two separate beams—the direct beam 292 from the Sun 290, and a light beam 282 from a street light 280, for illustrative purposes. Each beam 292, 282 can be identified by the source identifier 205, which can provide the light point coordinates 208 to the tracking engine 225 and the command generator 215. The tracking engine 225 can track each of the beams 292, 282 across the field of view of the lens and dynamically update the light point coordinates 208 for the command generator 215. The command generator 215 can generate mask commands 217 based on the coordinates 208, which can be executed by the masking controller 250 to activate the blocking pixels 294 for the direct beam 292 and blocking pixels 284 for the light beam 282.

Accordingly, as both the direct beam 292 and the light beam 282 traverse across the right lens of the stereo camera 210, the masking controller 250 can dynamically generate and transmit responsive voltage signals 252 to the pixels indicated by the tracked light point coordinates 208 in order to continuously block the direct beam 292 and the light beam 282 while they are in the field of view of the right lens. As discussed herein, the blocking pixels 294, 284 may be fully activated in binary implementations, or gray-scale activated in gray-scale implementations based on brightness values 209 measured by the source identifier 205.

In the discussion of FIG. 2, the intelligent lens masking system 200 can perform instantaneous, or near-instantaneous, and dynamic masking of light sources as the AV 100 travels along any given route. In binary aspects, the masking controller 250 can generate the same voltage signals 252 to activate specified blocking pixels. In gray-scale aspects, the masking controller 250 can generate a variety of voltage signals 252 based on the relative brightness and/or brightness gradient across multiple pixels encompassing the light source. Furthermore, the command generator 215 can determine an angular size and shape of the light source based on brightness values 209 measured by the source identifier 205, and cause the masking controller 250 to generate corresponding voltage signals 252 for the corresponding pixels to block the light source accordingly. The voltage signals 252 can result in gray-scaled gradients for the blocking pixels 234, 284, 294 (e.g., a point gradient for the Sun 290 having higher brightness values 209, and thus higher voltage signal values 252, at the center). Accordingly, light sources that would otherwise negatively affect the data quality for the AV's 100 on-board data processing system 110 are preemptively blocked, which can reduce processing requirements and enhance the operational flow of the AV 100 itself.

Methodology

Figure 3:
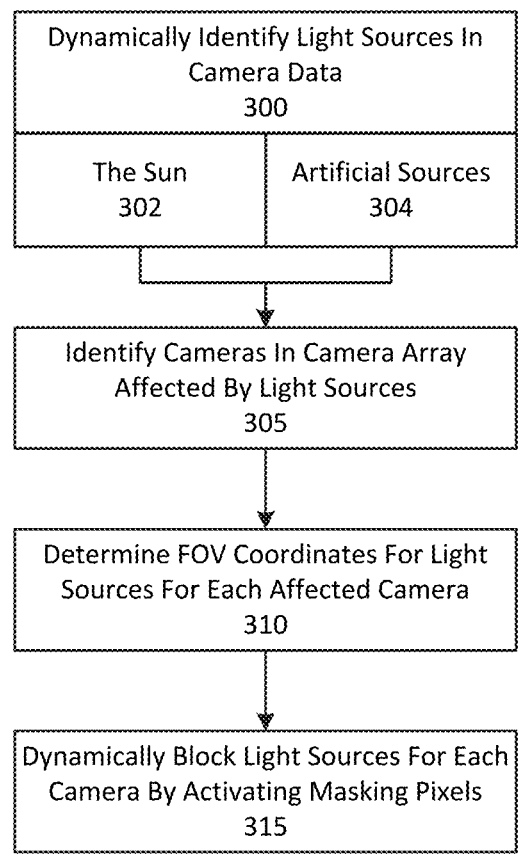
FIG. 3 is a high level flow chart describing an example method of dynamically masking light sources for a camera system of an AV.

FIG. 3 is a high level flow chart describing an example method of dynamically masking light sources for a camera system of an AV 100. In the below description of FIG. 3, reference may be made to reference characters representing like features illustrated in FIG. 1. Furthermore, the high level process described with respect to FIG. 3 may be performed by an example intelligent lens masking system 135 described with respect to FIG. 1, or the intelligent lens masking system 200 described with respect to FIG. 2. Referring the FIG. 3, the intelligent lens masking system 135 can dynamically identify light sources in real-time camera data 109 (300). The light sources can correspond to the Sun (302) (e.g., direct sunlight, reflected sunlight, or diffused sunlight through clouds), or from artificial light sources (304) (e.g., headlights, emergency vehicle lights, street lights, stadium lights, road construction lights, etc.).

In many aspects, the intelligent lens masking system 135 can identify the cameras in the camera array 105 that are affected by the light sources (305). For each camera (or camera lens therein), the intelligent lens masking system 135 can determine field of view coordinates for each light source (310). Using the field of view coordinates, the intelligent lens masking system 135 can dynamically block each of the light sources for the camera(s) by activating and deactivating blocking pixels on a masking layer of the lens(es) of the camera(s) (315). The intelligent lens masking system 135 can perform the process described with respect to FIG. 3 continuously for any number of passing lights sources as the AV 100 travels through a given region. Furthermore, for each light source, the intelligent lens masking system 135 can identify the light source immediately when it enters the field of view, and activate corresponding pixels to block the light source as long as the light source is within the field of view of a particular lens.

Figure 4:
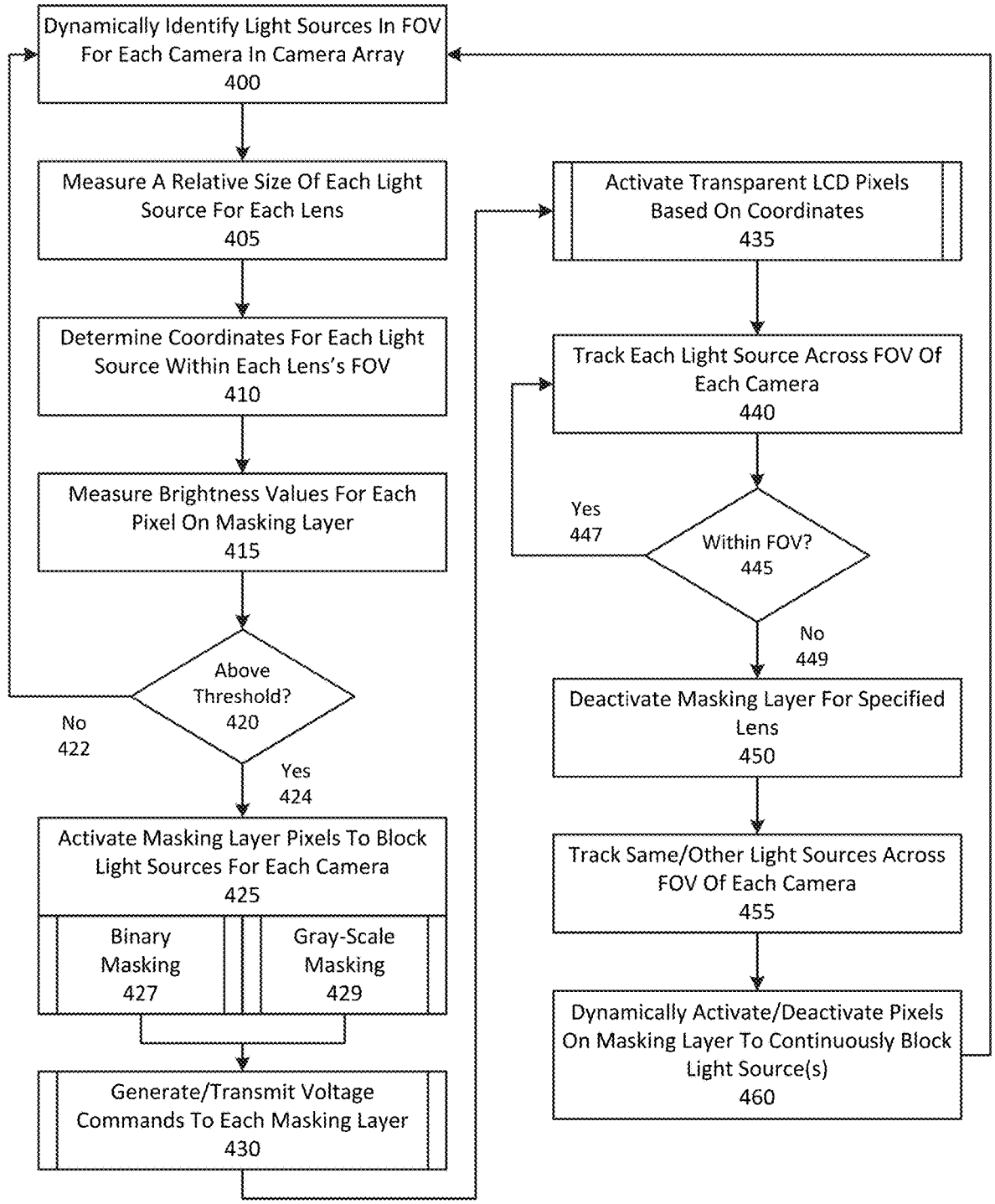
FIG. 4 is a low level flow chart describing an example method of dynamically masking light sources for a camera system of an AV.

FIG. 4 is a low level flow chart describing an example method of dynamically masking light sources for a camera system of an AV 100. In the below description of FIG. 4, reference may be made to reference characters representing like features illustrated in FIG. 1. Furthermore, the low level process described with respect to FIG. 4 may be performed by an example intelligent lens masking system 135 described with respect to FIG. 1, or the intelligent lens masking system 200 described with respect to FIG. 2. Referring the FIG. 4, the intelligent lens masking system 135 can dynamically identify light sources within the field of view of each lens for each camera in the AV's 100 camera array 105 (400). As discussed herein, the cameras can be individual cameras, stereo cameras 112 having multiple lenses, infrared cameras, or ultraviolet cameras (e.g., UV reflectance imaging device).

In many examples, the intelligent lens masking system 135 can measure a relative angular size and shape of each light source for each camera (405). Additionally, the intelligent lens masking system 135 can determine coordinates for each light source within the field of view of each lens (410). The coordinates can precisely indicate the boundaries of each light source, or a central location for each light source in the field of view. In some aspects, the intelligent lens masking system 135 can also measure brightness values for each pixel of the masking layer (415), or each pixel of interest corresponding to a light source. For example, the intelligent lens masking system 135 can generate a matrix of brightness values for the light source.

According to many examples, the intelligent lens masking system 135 can determine whether an overall brightness for the light source exceeds a predetermined threshold (420). For example, the intelligent lens masking system 135 can determine whether the brightness exceeds a minimum threshold to trigger binary masking of the light source on the masking layer. As another example, the intelligent lens masking system 135 can determine whether each pixel of the generated brightness value matrix exceeds a minimum threshold brightness. As described herein, the minimum threshold can be correlated to the impact on the data quality. For certain light sources, the impact on data quality may be minimal (i.e., measured below the threshold brightness (422)) such that there is no need to mask the light source on the camera lens. For such a light source, or individual pixels corresponding to the light source, the intelligent lens masking system 135 can disregard the light source and continue to dynamically identify light sources within the field of view of the lens (400).

However, if the light source exceeds the threshold brightness (424), then the intelligent lens masking system 135 can activate specified masking layer pixels to block the light source for each affected camera (425). The intelligent lens masking system 135 can perform such active masking for any number of detected light sources that exceed the minimum brightness threshold. Furthermore, in some examples, the intelligent lens masking system 135 can perform binary masking (427), which fully activates the corresponding pixels to precisely block the light source. In other examples, the intelligent lens masking system 135 can perform grayscale masking (429), which gray-scales certain pixels, thus producing gray-scale gradients, based on the measured brightness value (e.g., according to the generated brightness value matrix).

Accordingly, the intelligent lens masking system 135 can generate and transmit suitable voltage signals to each masking layer 114 to block the light source(s) while the light source(s) remain in the field of view of a particular lens (430). In some aspects, the masking layer comprises a transparent LCD display layer, and thus the intelligent lens masking system 135 can activate, or otherwise generate appropriate voltage signals for the specified pixels of the LCD display layer (435).

In many examples, the intelligent lens masking system 135 can track each light source across the field of view of each camera of the AV 100 as the AV 100 travels throughout a given region (440). The intelligent lens masking system 135 may determine, for each light source in the field of view of each camera lens on the AV 100, whether the light source remains within the field of view of the particular lens (445). If so (447), then the intelligent lens masking system 135 can continue to track the light source across the field of view (440). However, if the light source(s) exit(s) the field of view of a particular lens (449), then the intelligent lens masking system can deactivate the masking layer for that particular lens (450). The intelligent lens masking system 135 can continue to track the same light source and/or other light sources across the fields of view of each camera (455). As provided herein, the intelligent lens masking system 135 can dynamically activate and deactivate pixels on respective masking layers of respective cameras to continuously block light sources (460), and continue to dynamically light sources within the fields of view of the AV's 100 cameras (400).

Hardware Diagram

Figure 5:
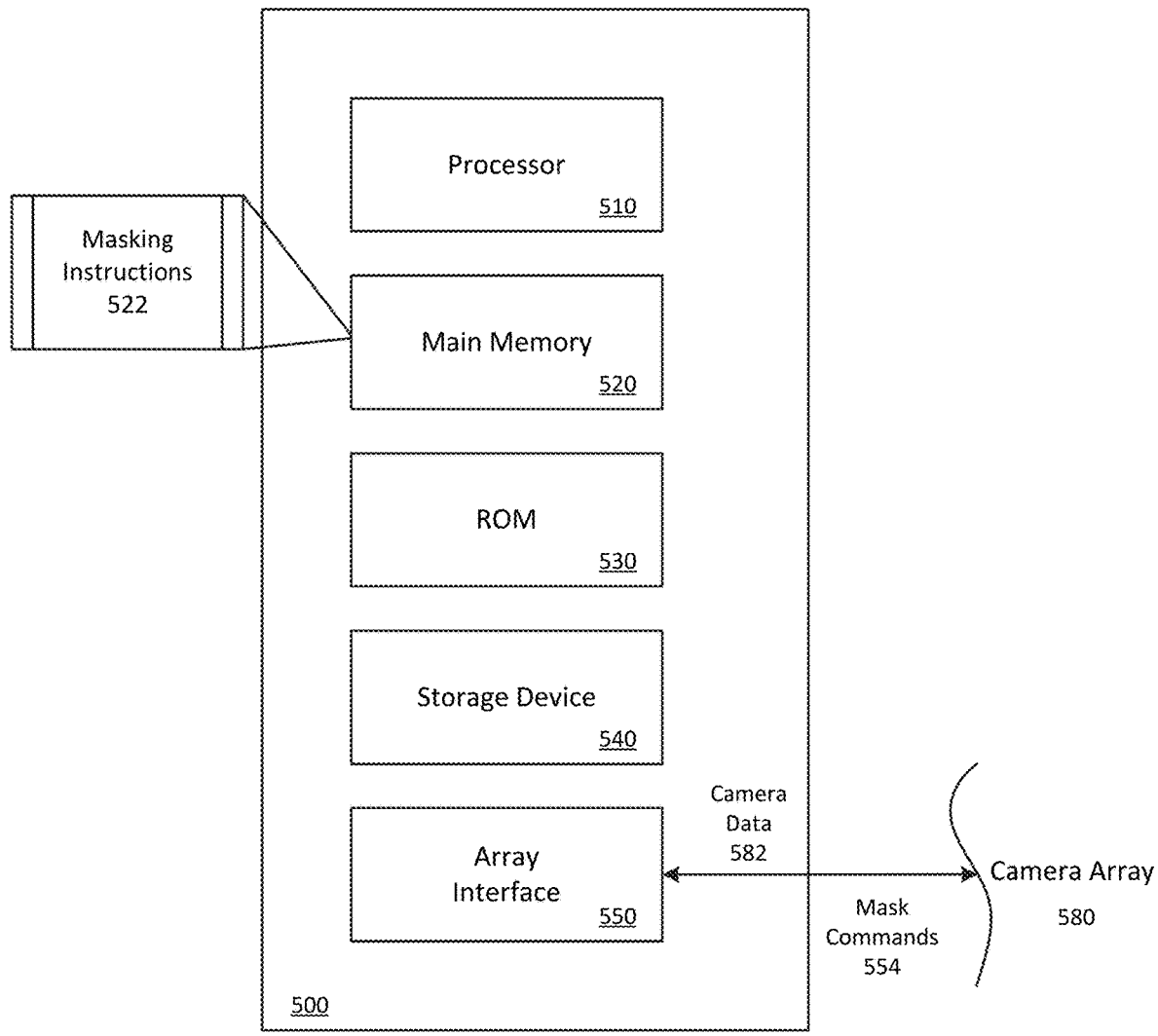
FIG. 5 is a block diagram illustrating a computer system upon which examples described herein may be implemented.

FIG. 5 is a block diagram that illustrates a computer system 500 upon which examples described herein may be implemented. A computer system 500 can be implemented on, for example, a server or combination of servers. For example, the computer system 500 may be implemented as the intelligent lens masking system 135 or 200 as shown and described with respect to FIGS. 1 and 2. In certain aspects, the functions of the intelligent lens masking system 200 can be implemented as part of the on-board data processing system 110 of the AV 100 as shown and described with respect to FIG. 1—which itself may be represented by the computer system 500 shown in FIG. 5. The intelligent lens masking system 200 may also be implemented using a standalone system or a combination of multiple computer systems 500 as described in connection with FIG. 5.

In one implementation, the computer system 500 includes processing resources 510, a main memory 520, a read-only memory (ROM) 530, a storage device 540, and an array interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The array interface 550 enables the computer system 500 to communicate with the components of the camera array 580 (e.g., the masking layer 114) through use of wireless electronic links or a wired interface such as an internal and/or external bus. In accordance with examples, the computer system 500 receives real-time camera data 582 via the sensor array 105 of the AV 100. The executable instructions stored in the memory 530 can include masking instructions 522, which the processor 510 executes to determine and execute a set of mask commands 554 to actively block light sources within the fields of view of the AV's 100 camera systems.

The processor 510 is configured with software and/or other logic to perform one or more processes, steps and other functions described with implementations, such as described in connection with FIGS. 1 through 4, and elsewhere in the present application.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An autonomous vehicle (AV) comprising:
   a set of cameras generating image data of a surrounding environment of the AV;
   a masking layer associated with each of one or more of the cameras, the masking layer comprising a plurality of pixels;
   acceleration, braking, and steering systems; and
   an AV control system comprising one or more processors executing instructions, causing the AV control system to:
   as the AV operates along a route, detect, in first image data generated by the set of cameras, one or more light sources in a field of view of a respective camera of the set of cameras;
   activate a number of pixels of the masking layer to block each of the one or more light sources for the respective camera, preemptively bolstering a quality of second image data generated by the set of cameras while the masking layer blocks each of the one or more light sources; and
   autonomously operate the AV along the route based on analyzing the second image data in view of other data associated with the route.

2. The AV of claim 1, wherein the executed instructions further cause the AV control system to track the one or more light sources in the field of view of the respective camera while autonomously operating the AV along the route.

3. The AV of claim 2, herein the executed instructions further cause the AV control system to activate and deactivate respective pixels of the masking layer, based on tracking the one or more light sources, to continuously block each of the one or more light sources as the AV travels along the route and while the one or more light sources remain in the field of view of the respective camera.

4. The AV of claim 1, wherein the masking layer comprises a liquid crystal display (LCD) layer.

5. The AV of claim 4, wherein the LCD layer comprises one of a transparent passive-matrix LCD) layer or a transparent active LCD) layer.

6. The AV of claim 1, wherein the executed instructions further cause the AV control system to:
   process the second image data by comparing the second image data to stored sub-maps that provide surface data of the route; and
   based on comparing the second image data with a current sub-map, autonomously operate the acceleration, braking, and steering systems along the route.

7. The AV of claim 1, wherein the masking layer comprises a grey-scaled masking layer, and wherein the executed instructions further cause the AV control system to:
   determine a brightness gradient for each light source of the one or more light sources; and generate voltage signals that cause the masking layer to dynamically block each of the one or more light sources on a grey-scale based on the brightness gradient for the respective light source.

8. The AV of claim 1, wherein the masking layer comprises a binary masking layer, and wherein the executed instructions further cause the AV control system to:
   determine, for each light source of the one or more light sources, whether a brightness of the light source exceeds a minimum threshold brightness for triggering binary masking of the light source on the masking layer; and
   dynamically block each light source of the one or more light sources based on the brightness of the respective light source exceeding the minimum threshold brightness.

9. The AV of claim 1, wherein each of a plurality of cameras in the set of cameras comprises a respective masking layer.

10. The AV of claim 1, wherein activation of the pixels of the masking layer further reduces processing of the image data by the AV control system.

11. An image processing system comprising:
   a set of cameras generating image data of a surrounding environment of a vehicle;
   a masking layer associated with each of one of more of the cameras, the masking layer comprising a plurality of pixels; and
   one or more processors executing instructions, causing the one or more processors to:
      as the vehicle operates along a route, detect, in first image data generated by the set of cameras, one or more light sources in a field of view of a respective camera of the set of cameras;
      activate a number of pixels of the masking layer to block each of the one or more light sources for the respective camera, preemptively bolstering a quality of second image data generated by the set of cameras while the masking layer blocks each of the one or more light sources; and
      autonomously operate the vehicle based on analyzing the second image data in view of other data associated with the route.

12. The image processing system of claim 11, wherein the executed instructions further cause the one or more processors to track the one or more light sources in the field of view of the respective camera.

13. The image processing system of claim 12, wherein the executed instructions further cause the one or more processors to activate and deactivate respective pixels of the masking layer, based on tracking the one or more light sources, to continuously block each of the one or more light sources as the vehicle travels along the route and while the one or more light sources remain in the field of view of the respective camera.

14. The image processing system of claim 11, wherein the masking layer comprises a liquid crystal display (LCD) layer.

15. The image processing system of claim 14, wherein the LCD layer comprises one of a transparent passive-matrix LCD layer or a transparent active LCD layer.

16. The image processing system of claim 11, wherein the masking layer comprises a grey-scaled masking layer, and wherein the executed instructions further cause the one or more processors to:
   determine a brightness gradient for each light source of the one or more light sources; and
   generate voltage signals that cause the masking layer to dynamically block each of the one or more light sources on a grey-scale based on the brightness gradient for the respective light source.

17. The image processing system of claim 11, wherein the masking layer comprises a binary masking layer, and wherein the executed instructions further cause the one or more processors to:
   determine, for each light source of the one or more light sources, whether a brightness of the light source exceeds a minimum threshold brightness for triggering binary masking of the light source on the masking layer; and
   dynamically block each light source of the one or more light sources based on the brightness of the respective light source exceeding the minimum threshold brightness.

18. The image processing system of claim 11, wherein the masking layer is included as a component of the set of cameras.

19. The image processing system of claim 11, wherein activation of the pixels of the masking layer further reduces processing of the image data by the image processing system.

20. A computer-implemented method of processing image data for a vehicle, the method being performed by one or more processors and comprising:
   as the vehicle operates along a route, detecting, in first image data generated by a set of cameras, one or more light sources in a field of view of a respective camera of the set of cameras;
   activating a number of pixels of a masking layer associated with the respective camera, to block each of the one or more light sources for the respective camera, preemptively bolstering a quality of second image data generated by the set of cameras while the masking layer blocks each of the one or more light sources; and
   autonomously operate the vehicle based on analyzing the second image data in view of other data associated with the route.

* * * * *